United States Patent [19]

Satoh

[11] Patent Number: 4,558,498
[45] Date of Patent: Dec. 17, 1985

[54] PROCESS FOR THE MANUFACTURE OF SOLENOID OPERATED VALVE

[75] Inventor: Yuji Satoh, Higashi-Matsuyama, Japan

[73] Assignee: Diesel Kiki Co., Ltd., Tokyo, Japan

[21] Appl. No.: 548,874

[22] Filed: Nov. 4, 1983

[30] Foreign Application Priority Data

Nov. 12, 1982 [JP] Japan ................... 57-198771

[51] Int. Cl.[4] ........................................... B21D 53/00
[52] U.S. Cl. .................................. 29/157.1 R; 29/283; 29/407; 29/434; 29/445; 137/315; 239/600; 251/359; 251/129.20
[58] Field of Search ............ 29/157.1 R, 434, 445, 29/283, 407; 137/15, 315; 251/138, 141, 359; 239/600

[56] References Cited

U.S. PATENT DOCUMENTS

| | | | |
|---|---|---|---|
| 3,636,622 | 1/1972 | Schmitt | 29/407 X |
| 3,736,640 | 6/1973 | Freiheit | 29/157.1 R |
| 3,774,277 | 11/1973 | Bentley-Leck | 29/157.1 R |
| 3,785,029 | 1/1974 | McClellan et al. | 29/157.1 R |
| 4,084,304 | 4/1978 | Meyers | 29/157.1 R |
| 4,106,170 | 8/1978 | Schoeneweis | 29/407 X |
| 4,199,850 | 4/1980 | Velan | 29/445 X |
| 4,399,944 | 8/1983 | Kauss et al. | 239/600 X |

Primary Examiner—Howard N. Goldberg
Assistant Examiner—Ronald S. Wallace
Attorney, Agent, or Firm—Wenderoth, Lind & Ponack

[57] ABSTRACT

A process for the manufacture of a solenoid operated valve of the double valve seat type ensures that the stroke distance of a ball valve between two valve seats is accurately provided. The ball valve is positioned on a portion of a first valve seat member, and a first jig is mounted on the ball valve. The jig is pressed until an end surface thereof and an abutting surface of the first valve seat member are contacted, thereby forming a first valve seat. The ball valve then is positioned on a portion of the second valve seat member, and a second jig is pressed toward the ball valve until an end surface of the second jig abuts an abutting surface of the second valve seat member, thereby forming a second valve seat. The abutting surfaces of the two valve seat members are abutted, and the two valve seat members are assembled.

3 Claims, 7 Drawing Figures

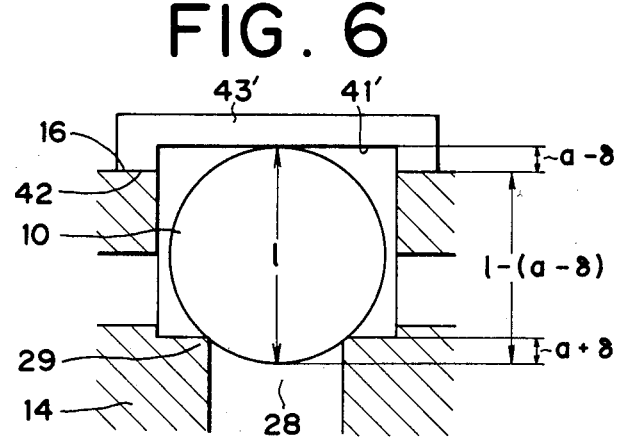
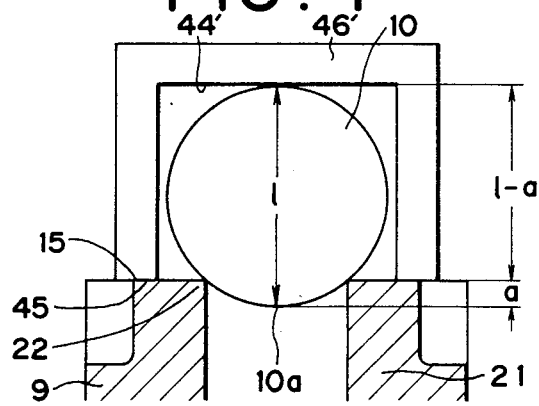

PROCESS FOR THE MANUFACTURE OF SOLENOID OPERATED VALVE

BACKGROUND OF THE INVENTION

This invention relates to a process for the manufacture of a solenoid operated valve, particularly a solenoid operated valve of the double seat type having valve seats at spaced symmetric positions.

A solenoid operated valve of the double seat type includes first and second valve seat members abutted at mutual joining surfaces, and a ball valve disposed in a valve housing chamber defined between the two seat members. The ball valve is seatable alternately on the two valve seats, as disclosed in Japanese Patent Publication No. 49-10371. In forming a solenoid operated valve of this type, it is not possible to obtain correct accuracy only by cutting operations of the valve seat members, since the distance of shaft of the ball valve between the double valve seats is very small, namely, $10^{-1}$ mm.

For this reason, in the conventional manufacturing technique, when the valve seat members are assembled, a spacer is interposed between the joined surfaces thereof, and the distance between the two seats is adjusted to control the amount of lift of the ball member by adjustment of the thickness of the spacer. Thereafter, the valve seat members are assembled to obtain a correct lift amount. The adjustment of the amount of lift at the time of assembly particularly is extremely difficult as the amount of lift is $10^{-1}$ mm, and many hours are required for manufacture.

SUMMARY OF THE INVENTION

A first object of this invention is to uniformly and accurately provide the amount of lift of a ball valve seat between two valve seats.

A second object of this invention is to facilitate adjustment of the amount of lift of the ball valve.

A third object of this invention is to decrease the number of component parts of the solenoid operated valve.

BRIEF DESCRIPTION OF THE DRAWINGS

These objects are achieved by this invention, embodiments of which are illustrated in the attached drawings, wherein:

FIGS. 6 and 7 are explanatory views showing the process for the manufacture of the solenoid opefated valve according to another embodiment of this invention.

DETAILED DESCRIPTION OF THE INVENTION

Figure 1:
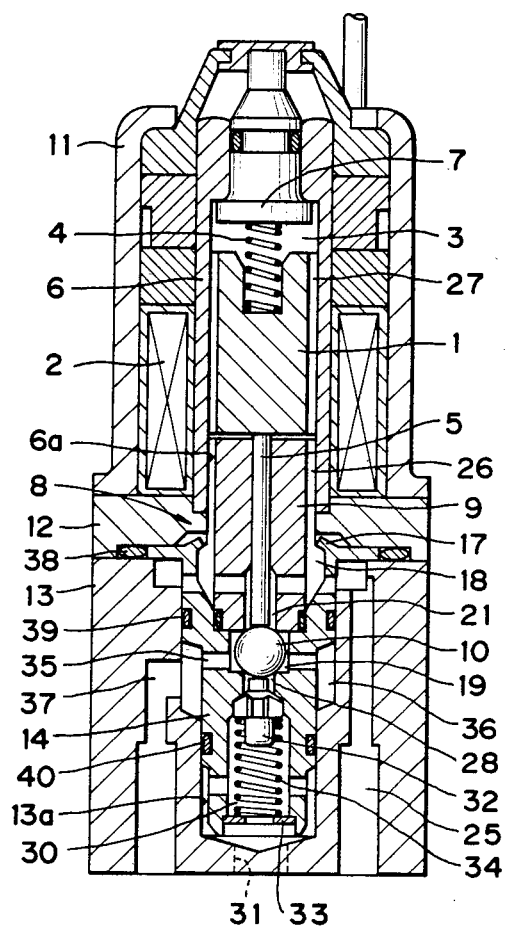
FIG. 1 is a cross section of a solenoid operated valve formed according to this invntion.

Hereinbelow, embodiments of this invention will be described by referring to the drawings.

Figure 2:
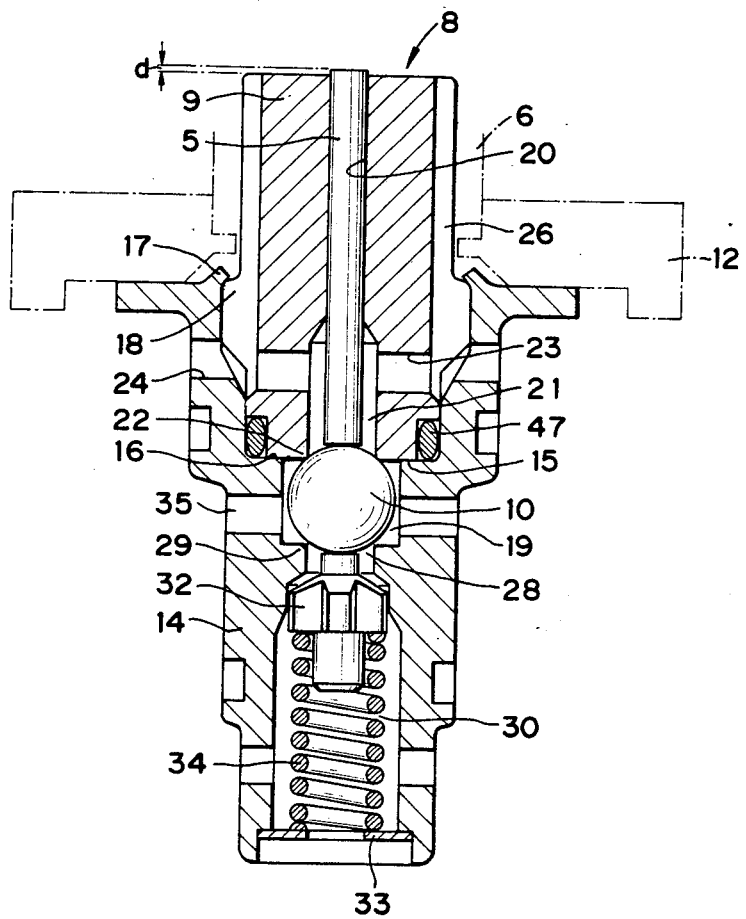
FIG. 2 is an enlarged cross section of a valve element of such solenoid operated valve.

In FIGS. 1 and 2 is illustrated a solenoid operated valve to which this invention is applied, and such valve includes a solenoid operated plunger 1 disposed in an operation chamber 3 formed centrally within a solenoid coil 2. Plunger 1 is reciprocably supported on its lower surface by a push rod 5 and at its upper surface by a spring 4. Plunger 1 is displaced a number of times equal to the number of pulses of an electromagnetic force generated by a pulse current supplied to the solenoid coil 2. The operation chamber 3 is shut off from the atmosphere by a surrounding yoke 6 and a spring receiving member 7 fixed to an upper end of the yoke 6. A valve seat member 9 of a valve element 8 is inserted into a hole 6a of the yoke 6. An air gap d between the valve seat member 9 and the solenoid operated plunger 1 is set to be at least larger than the stroke distance or amount of lift $\delta$ of a ball valve 10, to be described hereinafter.

The solenoid coil 2 is covered by a nonmagnetic cylindrical cover 11, and the lower end of cover 11 is fixed to a base portion 12. A housing 13 is fixed to a lower surface of the base portion 12, and valve element 8 is disposed in a grooved or recessed portion 13a formed in the housing 13.

The valve element 8 includes the valve seat member 9 and another valve seat member 14 as shown in detail in FIG. 2. The valve seat members 9 and 14 abut one another at mutual joining surfaces 15 and 16, and are sealed by means of an O-ring 47. An engaging portion 17 of the valve seat member 14 is bent and is engaged with a flange portion 18 of the valve seat member 9, such that the two members are coupled.

A ball valve housing chamber 19 is formed between and is surrounded by the two seat members 9 and 14, and spherical ball valve 10 is disposed in the ball valve housing chamber 19.

The valve seat member 9 is formed of magnetic material such as iron or the like, the push rod 5 is slidably disposed in a hole 20 formed therethrough, and one end of the push rod 5 abuts the ball valve 10. A port 21 opens into an upper portion of the ball valve housing chamber 19 and is formed by an enlarged diameter portion of hole 20 at the lower part of the valve seat member 9. One valve seat 22 is formed on a peripheral portion of the edge of member 9 at port 21.

The port 21 is connected to a pump, now shown in the drawings, by means of lateral holes 23 and 24 formed respectively in the valve seat members 9 and 14 and a passage 25 formed in the housing 13, and is communicated with an upper part of the operation chamber 3 by means of vertical grooves 26 and 27 formed respectively in the outer peripheral surfaces of the valve seat member 9 and the solenoid operated plunger 1. Accordingly, the ball valve 10 receives a downward force by the pressure of the spring 4 provided at the upper end of the solenoid operated plunger 1.

A port 28 that opens into a lower portion of the valve housing chamber 19 is formed by a recess in valve seat member 14, and a lower valve seat 29 is formed on the peripheral portion of the edge of member 14 at port 28. The ports 28 and 21 are of the same diameter.

The ball valve 10 shifts between the valve seats 29 and 22, thus achieving switching between the ports 21 and 28, but the amount of lift or displacement of the ball valve 10 between the valve seats 22 and 29 is set at a minute distance $\delta$ of $10^{-1}$ mm.

The port 28 is connected to a reservoir, not shown in the drawings, by means of a chamber 30 formed in the valve seat member 14 and a passage 31 of the housing 13. A rod 32 having an end abutting the ball valve 10 is disposed in the chamber 30. A spring 34 is positioned between rod 32 and a spring receiver 33 fixed to valve seat member 14, and the ball valve 10 is pressed upwardly by the force of spring 34.

When the solenoid operated coil 2 is not excited, the force of the spring 34 overcomes the force of spring 4 pressing the ball valve 10 downwardly, and the ball valve 10 is seated on the upper valve seat 22. Accordingly, the port 28 and a port 35 are in communicated condition.

The port 35 opens to the side of the ball housing chamber 19 and is connected to an actuator, not shown in the drawings, by means of an annular groove 36 defined between valve seat member 14 and housing 13 and a passage 37 in the housing 13.

Reference numerals 38, 39 and 40 denotes O rings which form seals between the base portion 12 and the housing 13 and between the housing 13 and the valve seat member 14.

Now, the operation of the solenoid operated valve having the foregoing construction will be described. When the solenoid coil 2 is not excited, the ball valve 10 is seated on the valve seat 22, and the port 35 is communicated with the port 28, whereby the actuator is at low pressure.

When pulse current flows to the solenoid coil 2, and the coil 2 is excited, the solenoid operated plunger 1 shifts toward the ball valve 10 and the ball valve 10 is seated on the valve seat 29. As a result, the port 21 and the port 35 are communicated so that the oil in the pump flows into the actuator. Thereafter, when current flow to the solenoid coil 2 again ceases, the ports 35 and 28 are connected, and the oil flowed into the actuator is returned to the tank. As described in the foregoing, the actuator is caused to perform work by controlling the pressure in the actuator.

Figure 3:
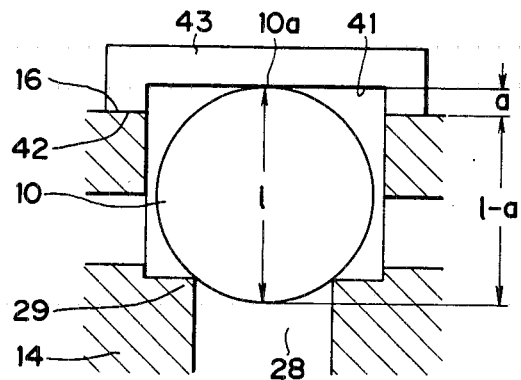
FIGS. 3 through 5 are explanatory views showing the process of the invention for the manufacture of the solenoid operated valve.
Figure 4:
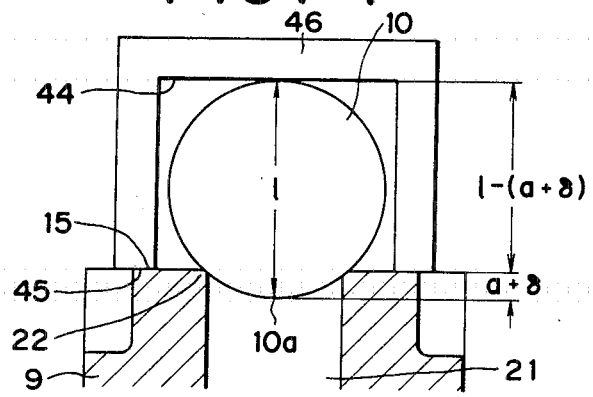

In order to manufacture this solenoid operated valve, the ball valve 10 is positioned on the edge of member 14 whereat the valve seat 29 is to be formed to a predetermined dimension, with member 14 positioned as shown in FIG. 3. A jig 43 having a concave portion 41 with a depth a from an end surface 42 of the jig 43 is pressed down until end surface 42 and surface 16 of the valve seat member 14 are in tight contact, thereby causing ball valve 10 to press into and deform the edge of member 14 and thus form seat 29. Next, member 9 is positioned as shown in FIG. 4, and the ball valve 10 is caused to abut the edge thereof whereat the valve seat 22 is to be formed. The diameter of the ball valve 10 is l, and a jig 46 having a concave portion 44 with a depth $\{l-(a+\delta)\}$ from an end surface 45 is positioned over the ball valve 10 in a manner similar to the foregoing. The jig 46 then is pressed down until the end surface 45 of the jig 46 and the surface 15 of the valve seat member 9 are in tight contact. This causes the ball valve 10 to deform the edge of member 9 and thus form the seat 22. The ball valve 10 then is disposed in the ball valve housing chamber 19 and the valve seat members 14 and 9 are abutted at the mutual joining surfaces 16 and 15 with O ring 47 therebetween. Then engaging portion 17 of valve seat member 14 is caulked and deformed to engage with the flange portion 18 of valve seat member 9, so that the valve seat members 9 and 14 are assembled. Next, the push rod 5 is inserted into the hole 20 of the valve seat member 9, the rod 32 and the spring 34 are disposed in the chamber 30 of the valve seat member 14 and are supported by the spring receiver 33, the assembly of the valve element 8 is completed, and the valve seat member 14 is inserted into the groove portion 13a of the housing 13 by means of the O rings 39 and 40.

Finally, the valve seat member 9 is inserted into the hole 6a of the yoke 6 previously assembled with the solenoid plunger 1, the solenoid operated coil 2 and the base portion 12 and the like, and the base portion 12 and the housing 13 are fixed by means of the O ring 38, whereby the assembly is completed.

Figure 5:
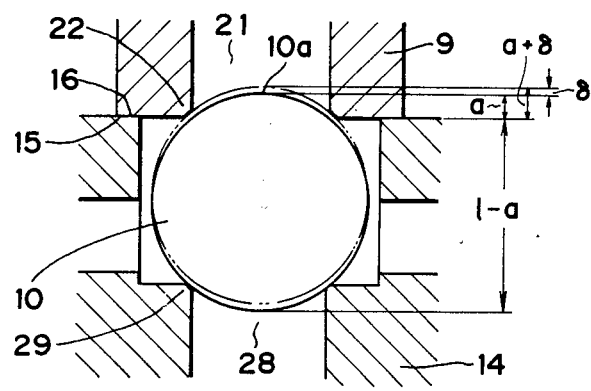

As shown in FIG. 3 the height from the joined surface 16 of the valve seat member 14 to the point 10a of the ball valve 10 is a when the ball valve 10 is seated on the valve seat 29 of the valve seat member 14, and as shown in FIG. 4, the height from the joined surface 15 of the valve seat member 9 to the point 10a of the ball valve 10 when the ball valve 10 is seated on the valve seat 22 of the one valve seat member 9 is $l-\{l-(a+\delta)\}$ namely, $(a+\delta)$. Accordingly, when the valve seat members 14 and 9 are assembled by causing the mutual joined surfaces 16 and 15 to abut, as shown in FIG. 5, the amount of lift or displacement of the ball valve 10 is the difference of the distances from the joining surfaces 15 and 16 to the point 10a, namely, $(a+\delta)-a=\delta$, and always will be a uniform magnitude.

In FIGS. 6 and 7, another embodiment of this invention is illustrated. In the first embodiment, the valve seat 22 at valve seat member 9 has a minute dimension $\delta$, and the jib 46 has a concave portion 44 having a depth produced by subtracting the amount a and the minute distance $\delta$ from the diameter of the ball valve 10 when the ball valve 10 is seated on the valve seat 22. Pressure is applied to the jib 46 covering the ball valve 10 and forms the valve seat 22 of minute distance $\delta$ in the valve seat member 9.

In the second embodiment, when the minute distance $\delta$ is formed at the side of the valve seat member 14, the depth of the concave portion 41' of the jig 43' is made to be a valve obtained by substracting the minute distance $\delta$ from a. The jig 43' is pressed downwardly until end surface 42 of the jig 43' is caused to abut the surface 16 of the valve seat member 14 on which the ball valve 10 is seated. Thereby, the valve seal 29 is formed by means of the ball valve 10 to be formed the minute distance $\delta$.

The end surface 46 of the jib 46' is caused to abut on the joining surface 15 of the valve seat member 14 with the ball valve 10 seated on the valve seat 22 by pressure applied to jig 46'. The depth of the concave portion 44' of the jig 46' is a dimension obtained by subtracting the amount a from the diameter of ball valve 10 so that the ball valve 10 is arranged to be positively seated on the valve seat 29.

As described in the foregoing, the fabricated valve seat members 9 and 14 are assembled by abutting the joining surfaces 15 and 16. The minute distance $\delta$ that is the amount of lift of the ball valve 10 is formed, not only on one valve seat member 9, but also the other valve seat member 14.

In both embodiments of the present invention the jigs 41, 46 or 41', 46' and the ball valve 10 are dimensioned to achieve the relationship that the depth of the respective first jig plus the depth of the respective second jig minus the diameter l of ball valve 10 equals the predetermined and desired stroke distance $\delta$.

What is claimed is:

1. A process for the manufacture of a solenoid operated valve of the type including a first valve seat member having a first valve seat and a first abutting surface, a second valve seat member having a second valve seat and a second abutting surface, said first and second valve seat members being assembled with said respective first and second abutting surfaces thereof in abutment and with said first and second valve seats thereof spaced by a housing chamber defined by said first and second valve seal members, and a ball valve positioned within said housing chamber and movable selectively by a stroke distance to seat alternately on said first and second valve seats, said process comprising:

positioning said ball valve on a portion of saif first valve seat member at which said first valve seat is to be formed;

positioning over said ball valve a first jig having a first end surface and a first ball contacting surface recessed from said first end surface by a first depth;

pressing said first jig toward said first valve seat member until said first end surface of said first jig abuts said first abutting surface of said first valve seat member, and thereby causing said ball valve to press into and deform said portion of said first valve seat member and thus form said first valve seat;

positioning said ball valve on a portion of said second valve seat member at which said second valve seat is to be formed;

positioning over said ball valve a second jig having a second end surface and a second ball contacting surface recessed from said second end surface by a second depth;

pressing said second jig toward said second valve seat member until said second end surface of said second jig abuts said second abutting surface of said second valve seat member, and thereby causing said ball valve to press into and deform said portion of said second valve seat member and thus form said second valve seat;

providing the dimensional relationships that said first depth plus said second depth minus the diameter of said ball valve equals a predetermined said stroke distance; and assembling said first and second valve seat members with said first and second abutting surfaces thereof in abutment, with said ball valve within said housing chamber and with said ball valve seated on one said valve seat and spaced from the other said valve seat by said predetermined stroke distance.

2. A process as claimed in claim 1, wherein said assembling comprises bending an engaging portion of one said valve seat member over a flange portion of the other valve seat member.

3. A process as claimed in claim 1, wherein each said valve seat member has therein a port, and the respective said portion of each said valve seat member comprises an annular edge defined by said port.

* * * * *